(12) United States Patent
Kemeny

(10) Patent No.: US 12,344,033 B2
(45) Date of Patent: Jul. 1, 2025

(54) WHEEL ASSEMBLY INCLUDING HINGED OUTER RIM SEGMENTS AND RELATED METHODS

(71) Applicant: GACW Incorporated, Chandler, AZ (US)

(72) Inventor: Zoltan Kemeny, Chandler, AZ (US)

(73) Assignee: GACW INCORPORATED, Chandler, AZ (US)

( * ) Notice: Subject to any disclaimer, the term of this patent is extended or adjusted under 35 U.S.C. 154(b) by 397 days.

(21) Appl. No.: 17/832,468

(22) Filed: Jun. 3, 2022

(65) Prior Publication Data

US 2023/0391136 A1    Dec. 7, 2023

(51) Int. Cl.
*B60B 25/02* (2006.01)
*B60B 9/24* (2006.01)
*B60C 7/08* (2006.01)

(52) U.S. Cl.
CPC ............ *B60B 25/02* (2013.01); *B60B 9/24* (2013.01); *B60C 7/08* (2013.01); *B60B 2320/10* (2013.01)

(58) Field of Classification Search
CPC .... B60B 9/02; B60B 9/24; B60B 9/28; B60B 25/02; B60G 15/12; B60C 7/08
See application file for complete search history.

(56) References Cited

U.S. PATENT DOCUMENTS

| | | | |
|---|---|---|---|
| 911,975 A | 2/1909 | Gustafson | |
| 1,201,747 A * | 10/1916 | Lenherr et al. | B60B 25/02 301/32 |
| 1,219,798 A * | 3/1917 | Bartholomew | B60B 25/02 301/31 |
| 1,345,912 A * | 7/1920 | Edling | B60B 9/04 152/12 |
| 1,601,518 A | 9/1926 | Weston | |
| 1,808,886 A | 6/1931 | Courtney | |
| 1,979,935 A | 11/1934 | Henap | |
| 3,647,239 A | 3/1972 | Teiji | |
| 6,041,838 A | 3/2000 | Al-Sabah | |
| 6,698,480 B1 | 3/2004 | Cornellier | |
| 2016/0363184 A1 * | 12/2016 | Noguchi | F16F 9/062 |
| 2020/0369079 A1 | 11/2020 | Kemeny | |
| 2020/0384801 A1 * | 12/2020 | Kemeny | B60B 9/24 |
| 2022/0055401 A1 | 2/2022 | Remo | |

FOREIGN PATENT DOCUMENTS

| | | |
|---|---|---|
| CN | 107139643 | 9/2017 |
| CN | 111120568 | 7/2021 |
| DE | 102009009453 | 8/2010 |

* cited by examiner

*Primary Examiner* — Kip T Kotter
(74) *Attorney, Agent, or Firm* — ALLEN, DYER, DOPPELT, + GILCHRIST, P.A.

(57) ABSTRACT

A wheel assembly may include an inner rim, and an outer rim surrounding the inner rim. The outer rim may include outer rim segments each hingeably coupled in end-to-end relation to an adjacent outer rim segment to define the outer rim. The wheel assembly may also include gas springs operatively coupled between the inner and outer rims, and tread members each carried by a respective one of outer rim segments.

19 Claims, 10 Drawing Sheets

WHEEL ASSEMBLY INCLUDING HINGED OUTER RIM SEGMENTS AND RELATED METHODS

TECHNICAL FIELD

The present invention relates to the field of wheels, and, more particularly, to wheel assemblies for a vehicle and related methods.

BACKGROUND

A typical wheel may include a rim and tire surrounding the rim. The tire transfers a load of a vehicle from the axle through the wheel to the ground. Tires, for example, those found on most vehicles are pneumatic tires. In other words, a typical tire is pneumatically inflated, for example, with air or other gas, such as nitrogen. More particularly, air is injected into the space between the rim and the inside of the tire to inflate it.

During operation, being pneumatically inflated, a tire absorbs the forces as the vehicle travels over the road surface. The tire and associated inflation pressure may be selected to absorb the above-noted forces while reducing any deformation. However, in many instances, excessive forces placed on the tire may cause the tire and/or rim to deform, puncture, or blowout. Typical forces also cause tread wear of the tire, while excessive forces may also cause rapid tread wear that may lead to a shortened lifespan of the tire and decreased structural integrity of the wheel.

To address the shortcomings of pneumatic-based wheels, non-pneumatic wheels have been developed. By non-pneumatic, it is meant that air or other gas is not injected to inflate an interior volume of a tire. One approach to a non-pneumatic wheel uses mechanical springs. For example, U.S. Pat. No. 911,975 to Gustafson discloses a spring wheel. Secondary spokes are arranged in pairs between pairs of main spokes and the members of each of the secondary spokes therefore pass upon opposite sides of a corresponding pair of intersecting braces. Each of the secondary spokes includes a pair of telescoping members that are pivotally connected at its outer end to ears formed on the hub and extends at its opposite end into a corresponding member.

U.S. Pat. No. 1,601,518 to Weston discloses a resilient wheel that includes radial arms. Connection between a hub and rim members may be provided by pivot pins in outer ends of these arms that have links journaled thereon. The links are pivotally articulated with bent levers, which are in turn pivoted on bracket arms that extend inwardly from the part-circular plates, which are mounted on an inner periphery of a tire holding rim.

Another approach includes a disc between a wheel hub and outer rim. For example, U.S. Pat. No. 1,808,886 to Courtney also discloses a disc or sidewall between a wheel hub and a rim. The disc is engaged by studs that project from the wheel hub and extends from an outer flange obliquely to the wheel hub. The disc assists the wheel tire and rim by resisting any tendency to become displayed laterally as a result of stresses occurring while the wheel is turning.

U.S. Pat. No. 1,979,935 to Henap discloses a hydraulic spoke wheel. Each of the hydraulic spokes include telescoping sections in the form of an outer section and an inner section. The outer section has the stud projecting from one end. The inner section extends from the outer section and is equipped at its extended end with the stem.

U.S. Pat. No. 6,041,838 to Al-Sabah discloses a wheel that includes spokes positioned in a spaced apart relation to each other. Each of the spokes has a first end connected to a rim and a second end connected to a plate member tip of a hub plate member in an offset position from the respective radial axis thereof. The offset position of each of the spokes is further defined by each of the spokes being connected to a respective one of the plate member tips at a predetermined angle (e.g., less than 90-degrees) from the radial axis thereof and defining an operative offset spoke axis, which intersects the radial axis of the plate member tips at the predetermined angle.

U.S. Pat. No. 6,698,480 to Cornellier discloses shock absorbing spokes each having a central cylindrical tube. Each tube has an interior cap having an aperture and an exterior cap having an aperture. Each spoke has an interior piston, a rod with an aperture and a pin. The pin pivotably couples one of the spokes to the hub. Each spoke has an exterior piston, a rod with an aperture and a pin. The pin pivotably couples one of the spokes to the rim assembly. The interior pistons and exterior pistons divide the space within each tube into an interior chamber, an exterior chamber, and a central chamber.

Despite advances in pneumatic tire wheels, and non-pneumatic tire wheels, there is still a need for improvements in wheel technology, particularly, for large construction vehicles, or mining vehicles, for example. The expense of wheel replacement, and the downtime experienced during wheel replacement may add significant expenses to the construction or mining projects.

SUMMARY

A wheel assembly may include an inner rim, and an outer rim surrounding the inner rim. The outer rim may include a plurality of outer rim segments each hingeably coupled in end-to-end relation to an adjacent outer rim segment to define the outer rim. The wheel assembly may also include a plurality of gas springs operatively coupled between the inner and outer rims, and a plurality of tread members each carried by a respective one of outer rim segments.

The wheel assembly may also include a plurality of lateral stops each coupled between the inner and outer rims. The plurality of lateral stops may include a plurality of hinge retainers, for example.

The plurality of gas springs may include a plurality of inboard gas springs and a plurality of outboard gas springs. The plurality of gas springs may be coupled between the inner rim and every other one of the plurality of outer rim segments, for example.

The wheel assembly may also include at least one inner ring extending radially outward from the inner rim. The at least one inner ring may include an inboard inner ring and an outboard inner ring, for example. The plurality of gas springs may have an operating stroke permitting the at least one inner ring to define a mechanical stop, for example.

The plurality of gas springs may include a plurality of gas springs with integrated hydraulic dampers. Each of the plurality of gas springs with integrated hydraulic dampers may include a first cylinder body and a second cylinder body slidable therein, and a first seal carried by an end of the second cylinder body defining first and second gas chambers within the first cylinder body. Each of the plurality of gas springs with integrated hydraulic dampers may also include a shaft extending within the first cylinder body and into the second cylinder body defining a hydraulic fluid chamber within the second cylinder body, and an enlarged orifice body coupled to the shaft defining a hydraulic damper with the second cylinder body.

A method aspect is directed to a method of making a wheel assembly. The method may include hingeably coupling a plurality of outer rim segments in end-to-end relation to an adjacent outer rim segment to define an outer rim. The method may include operatively coupling a plurality of gas springs between an inner rim and the outer rim. The method may also include mounting each of a plurality of tread members to a respective one of the outer rim segments.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
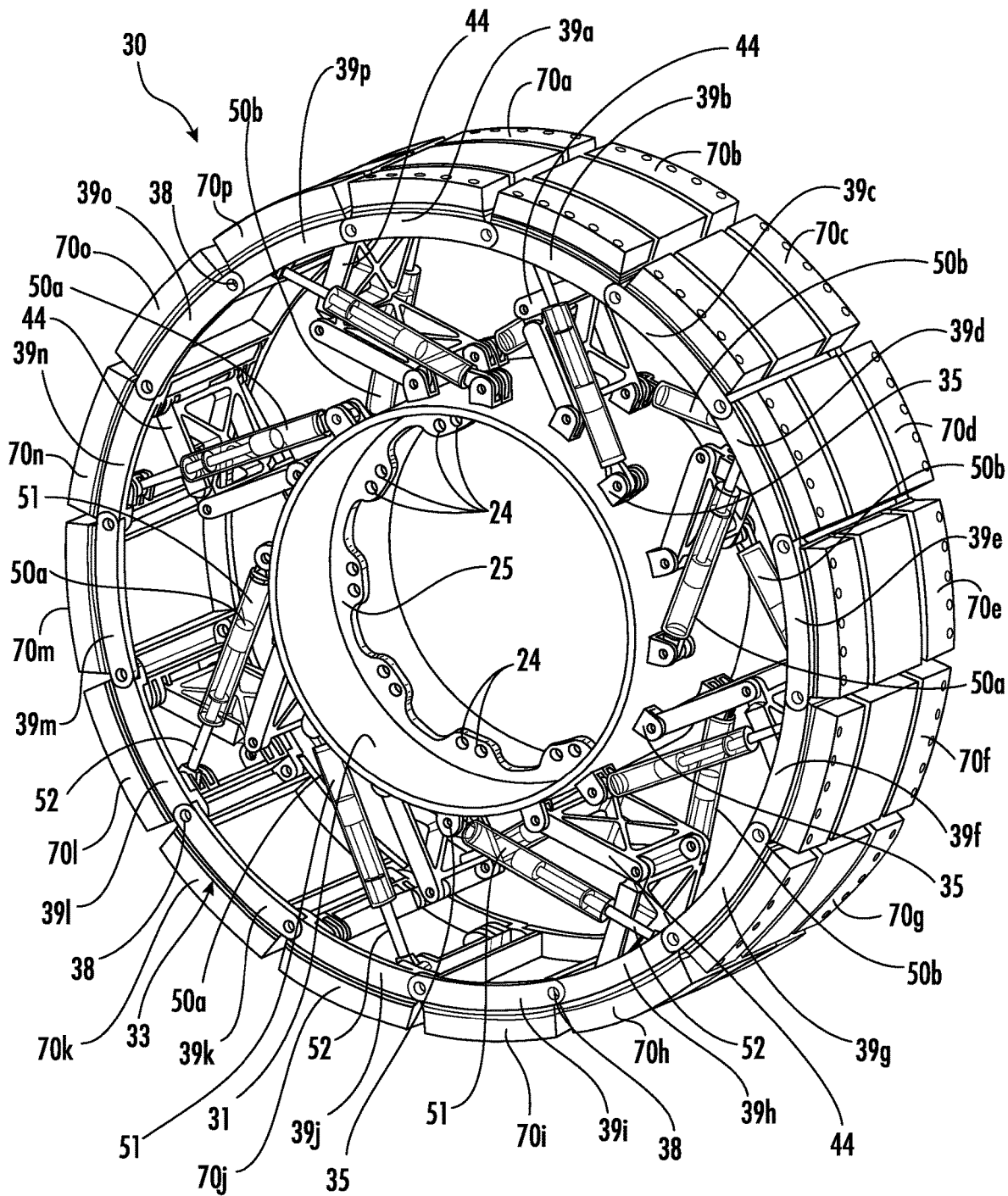
FIG. 1 is a schematic perspective view of a portion of a wheel assembly in accordance with an embodiment.
Figure 2:
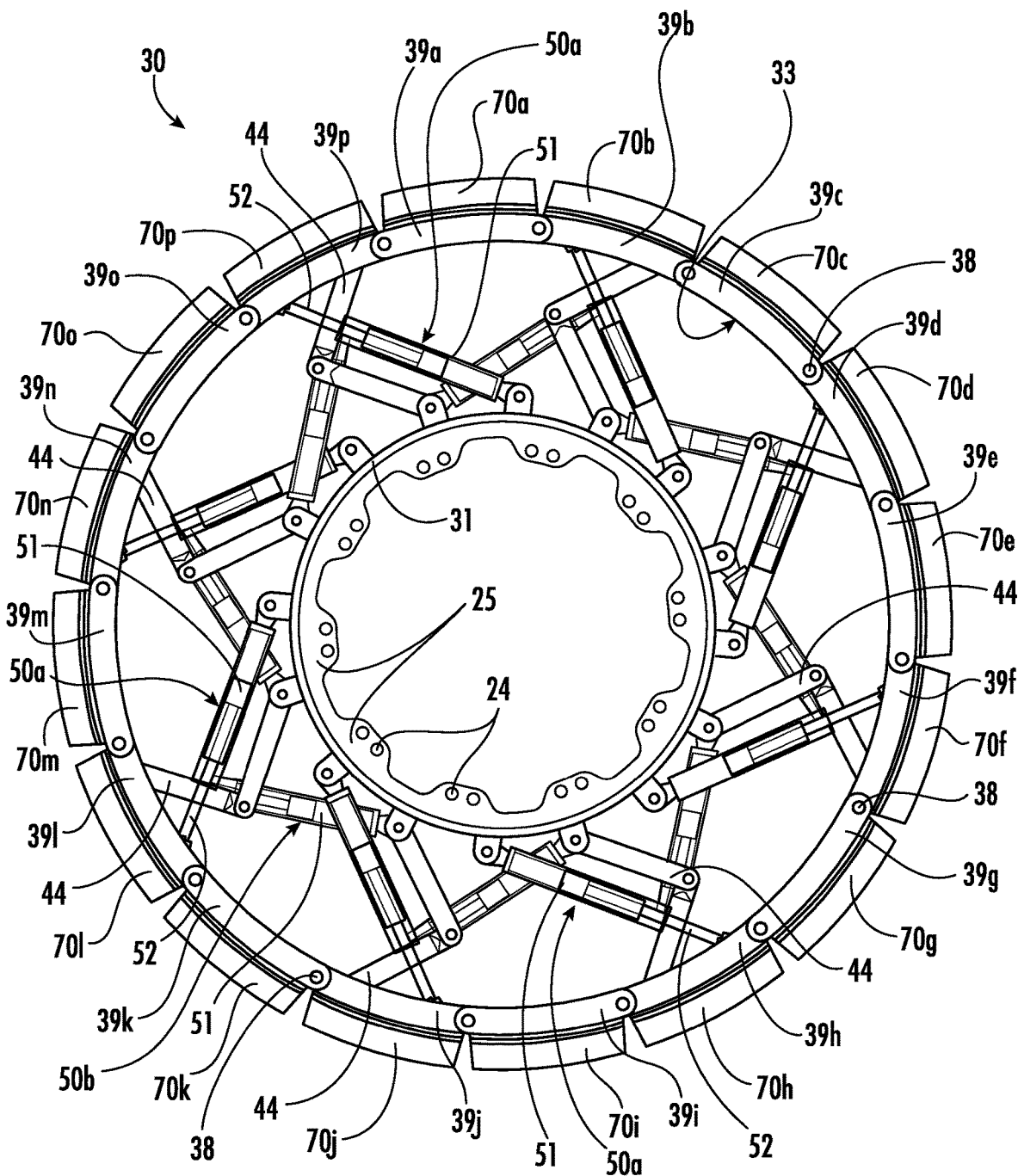
FIG. 2 is a schematic side view of the wheel assembly of FIG. 1.
Figure 3:
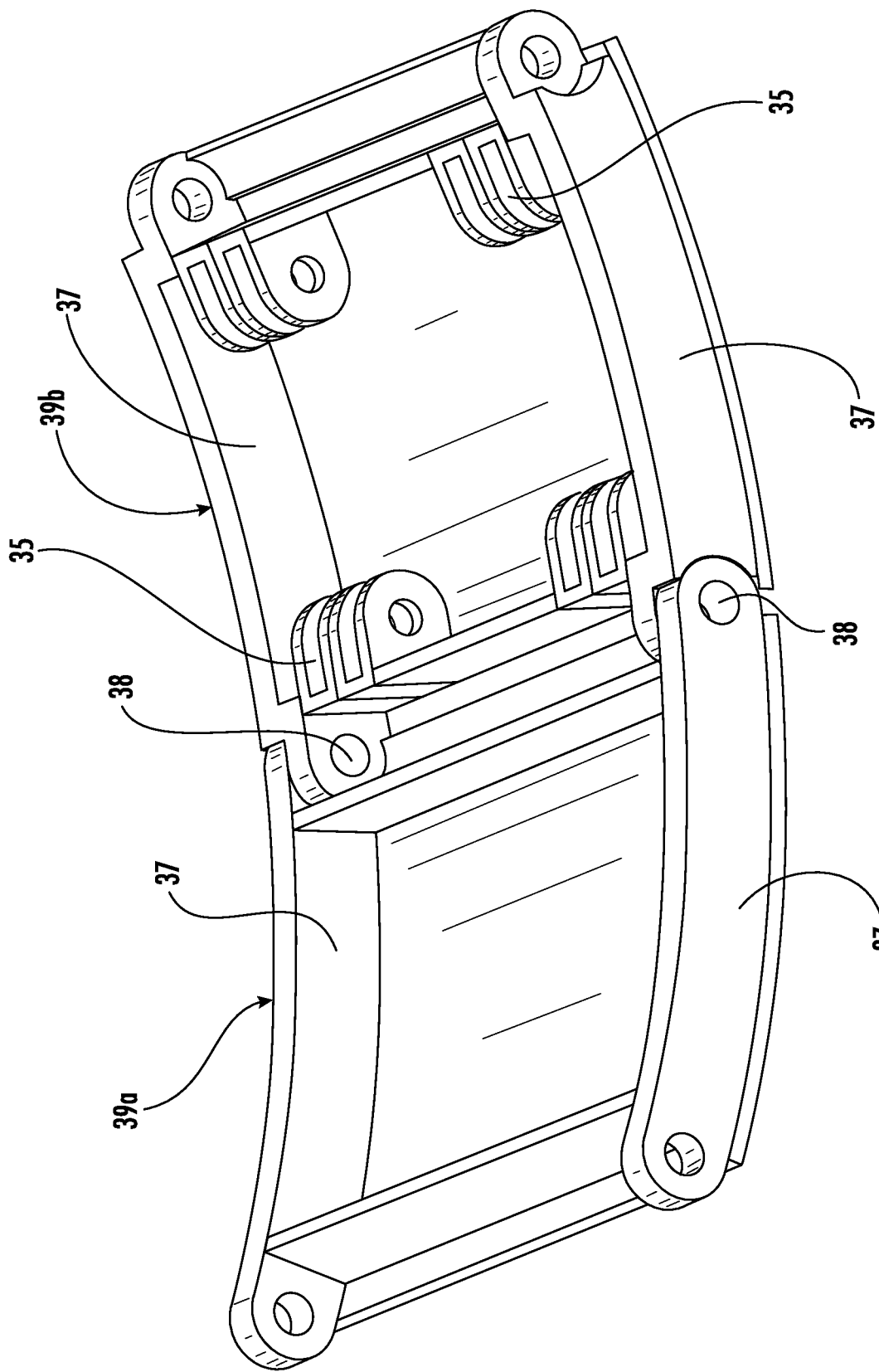
FIG. 3 is a schematic diagram of outer rim segments of the wheel assembly of FIG. 1.

Referring initially to FIGS. 1-3, a wheel assembly 30 to be coupled to a hub of a vehicle includes an inner rim 31 to be coupled to the hub of the vehicle. The inner rim 31 may be coupled to the hub of the vehicle with fasteners through fastener receiving passageways 24 within an inwardly extending flange ring 25.

The wheel assembly 30 also includes an outer rim 33 surrounding the inner rim 31. The outer rim 33 illustratively includes outer rim segments 39a-39p. Each outer rim segment 39a-39p is hingeably coupled in end-to-end relation to an adjacent outer rim segment to define the outer rim 33. Each outer rim segment 39a-39p has an arcuate shape and, when coupled to an adjacent outer rim segment, shares a common hinge pin 38 to permit adjacent outer rim segments to pivot relative to one another. Illustratively, there are inboard and outboard hinge pins 38. In some embodiments, the common hinge pins 38 may extend (e.g., through) radially inwardly extending sidewalls 37, for example, across a width of the outer rim, for example, between inboard and outboard sides. Other and/or additional coupling arrangements may be used between adjacent outer rim segments 39a-39p, as will be appreciated by those skilled in the art.

Inboard and outboard gas springs 50a, 50b are operatively coupled between the inner rim 31 and the outer rim 33. Each gas spring 50a, 50b may be a double-acting gas spring, for example, and include a double-acting gas cylinder 51 and an associated piston 52. Of course, in some embodiments, each gas spring 50a, 50b may be a single-acting gas spring. More than one type of gas spring 50a, 50b may be used. The inboard and outboard gas springs 50a, 50b may be air springs and/or nitrogen springs, for example. The inboard and outboard gas springs 50a, 50b may include other gasses as well.

Illustratively, the outboard gas springs 50b are coupled between an outboard side of the inner rim 31 and an outboard side of outer rim 33 via mounts 35, and the inboard gas springs 50a are coupled between an inboard side of the inner rim and an inboard side of the inner rim via mounts. More particularly, a given inboard and outboard gas spring pair 50a, is coupled to a given outer rim segment 39a-39p adjacent the inboard and outboard sides thereof, respectively. For the given outer rim segment 39a-39p the inboard and outboard gas springs 50b are coupled at opposing ends (i.e., adjacent a next end-to-end coupled outer rim segment).

The wheel assembly 30 also includes lateral stops 44 coupled between the inner and outer rims 31, 33. The lateral stops 44 are illustratively in the form of hinge retainers or scissor hinges, and extend across the width of the inner rim between the inboard and outboard sides. Each lateral stop 44 is coupled to the same outer rim segments 39a-39p as sets or pairs of the gas springs 50a, 50b. In some embodiments, each lateral stop 44 may not extend between the inboard and outboard sides of the inner rim 31, and each lateral stop may be coupled to different outer rim segments 39a-39p than the gas springs 50a, As will be appreciated by those skilled in the art, the lateral stops 44 provide increased strength and support to lateral forces that may be exerted on the wheel assembly 30.

The wheel assembly 30 also includes tread members 70a-70p carried by the outer rim 33. More particularly, each tread member 70a-70p is carried by a respective one of the outer rim segments 39a-39p. Each tread member 70a-70p is sized to be, at equilibrium for example, spaced apart from an adjacent tread member. Those skilled in the art will appreciate that under compression or as the outer rim segments are displaced, the spacing between adjacent tread members 70a-70p may close or become smaller. In some circumstances adjacent tread members may contact each other defining a mechanical stop therebetween. Each tread member 70a-70p may include rubber for example, and has a tread pattern. While a given tread pattern is illustrated, those skilled in the art will appreciate that there may be any tread pattern and/or different tread patterns, for example, based upon the environment of usage of the wheel assembly.

Figure 4:
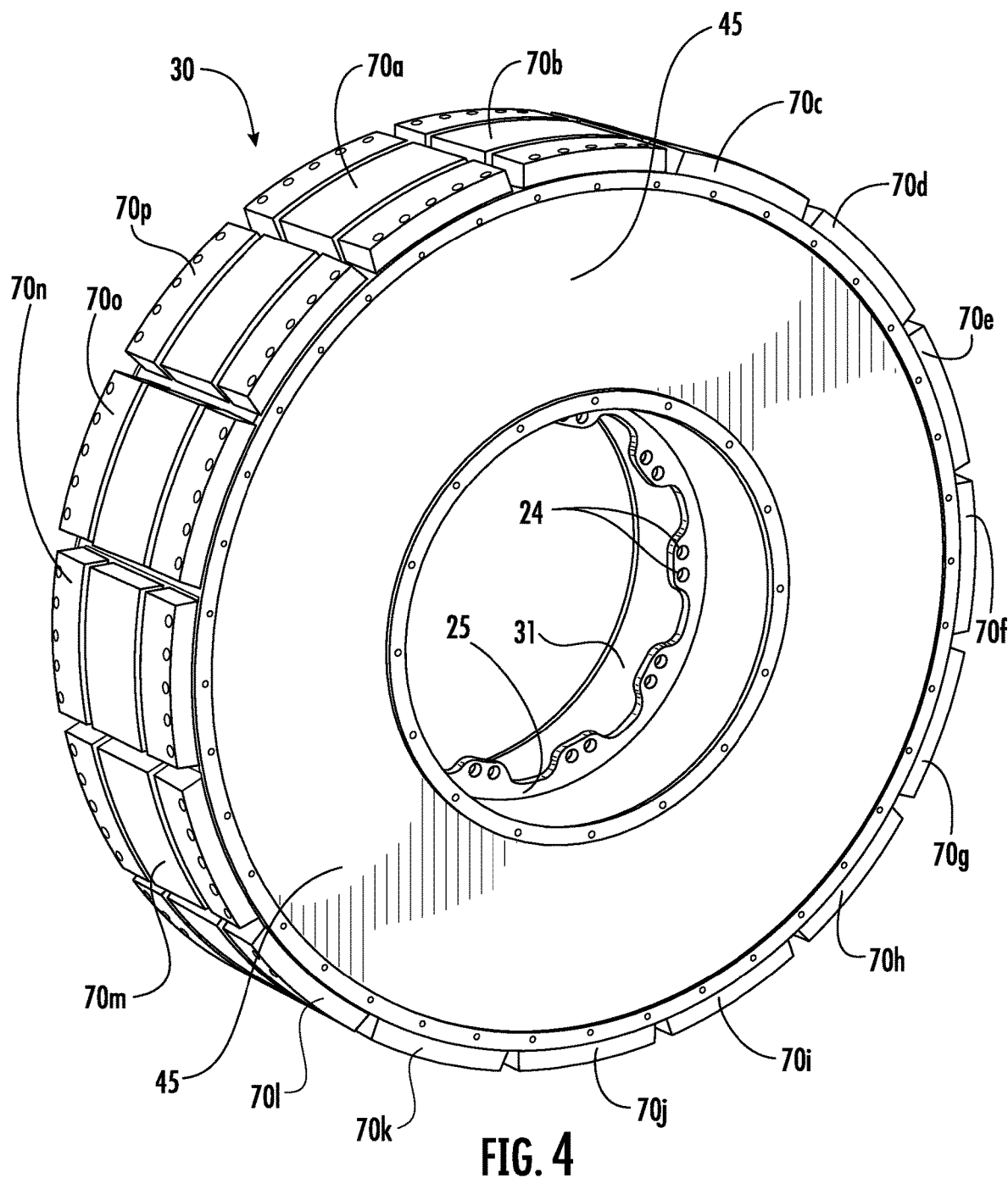
FIG. 4 is a schematic perspective view of the wheel assembly of FIG. 1 including a sidewall cover.

Referring additionally to FIG. 4, the wheel assembly may include a sidewall cover 45 extending between the inner rim 31 and the outer rim 33. The sidewall cover 45 may be rubber, for example, or other elastomeric material that flexes with compression or displacement of the outer rim segments 39a-39p. While an inboard sidewall cover 45 is illustrated, those skilled in the art will appreciate that the wheel assembly 30 may also include an outboard sidewall cover.

Figure 5:
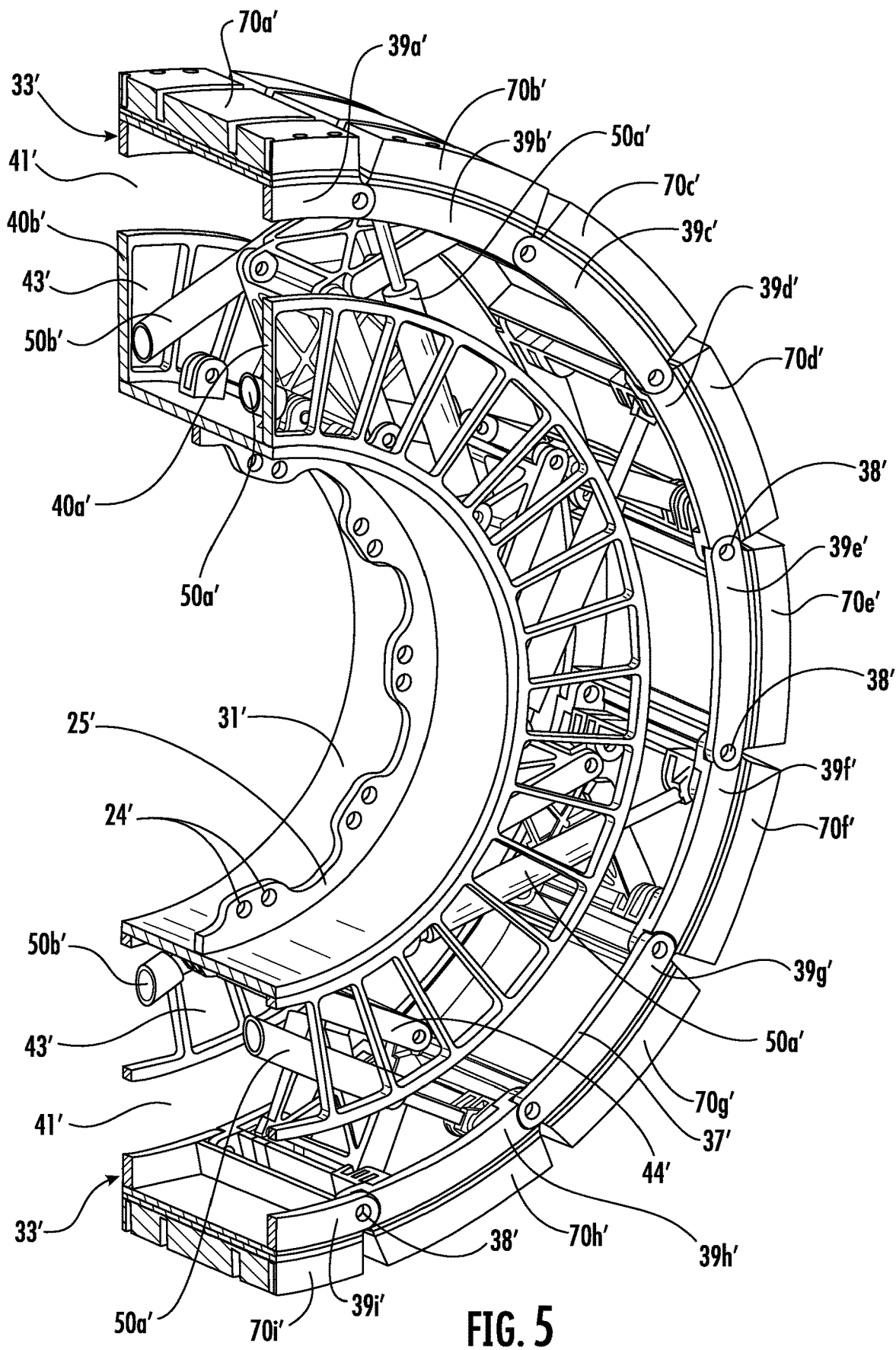
FIG. 5 is a schematic diagram of a portion of a wheel assembly in accordance with another embodiment.
Figure 6:
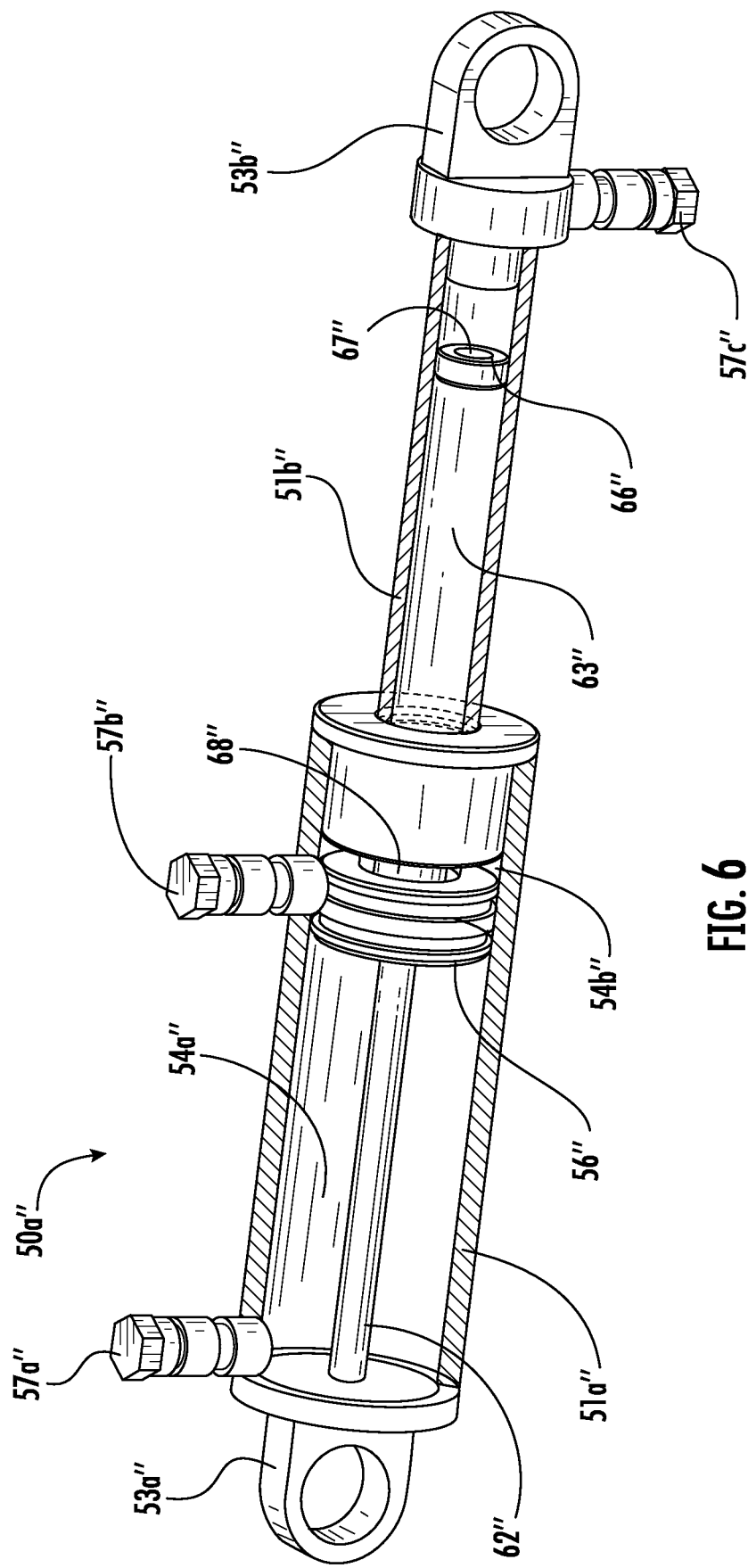
FIG. 6 is a partial cut-away view of a gas spring with associated integral hydraulic damper for use with a wheel assembly in accordance with an embodiment.
Figure 7:
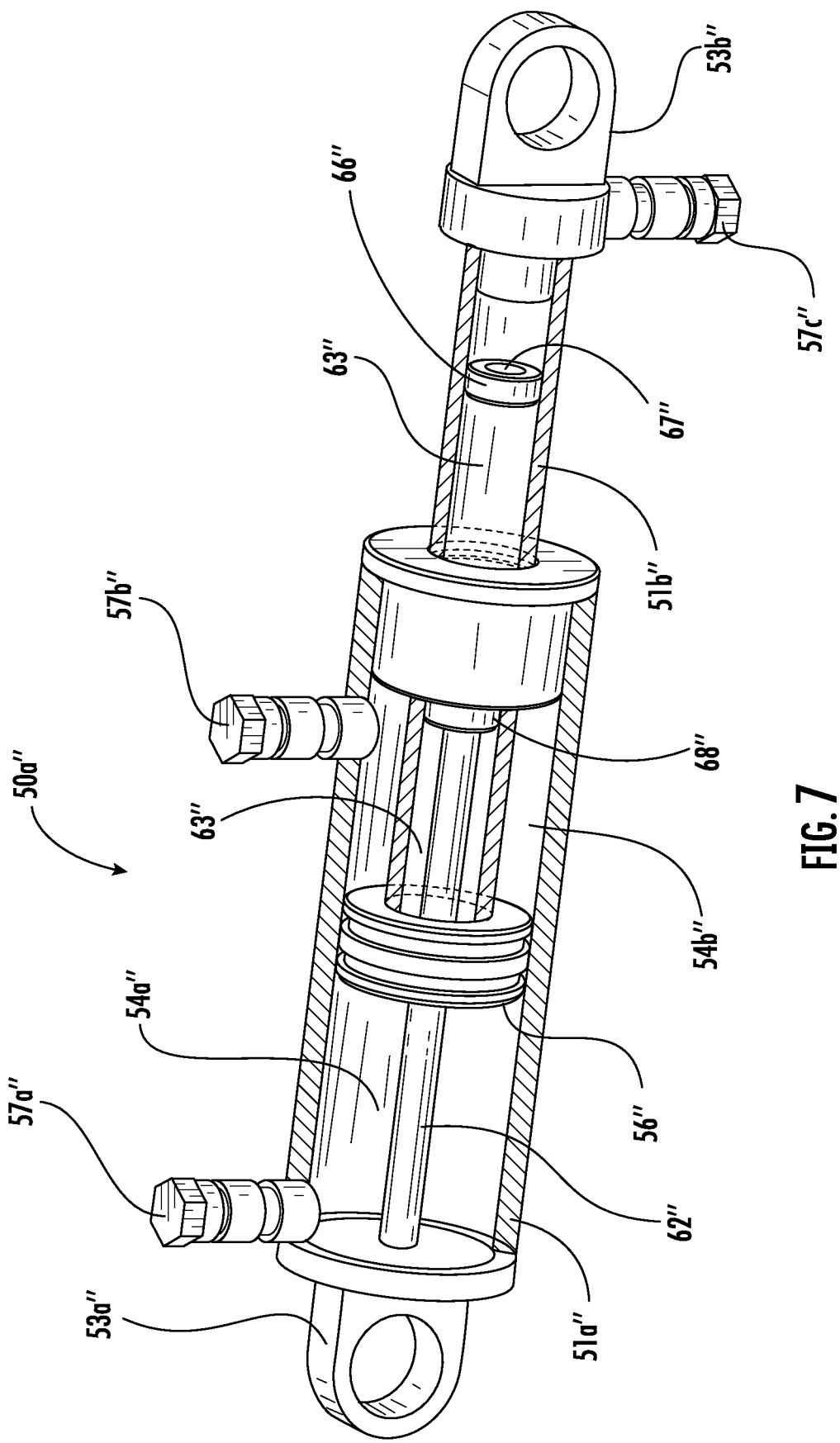
FIG. 7 is another partial cut-away view of the gas spring with associated integral hydraulic damper of FIG. 6.
Figure 8:
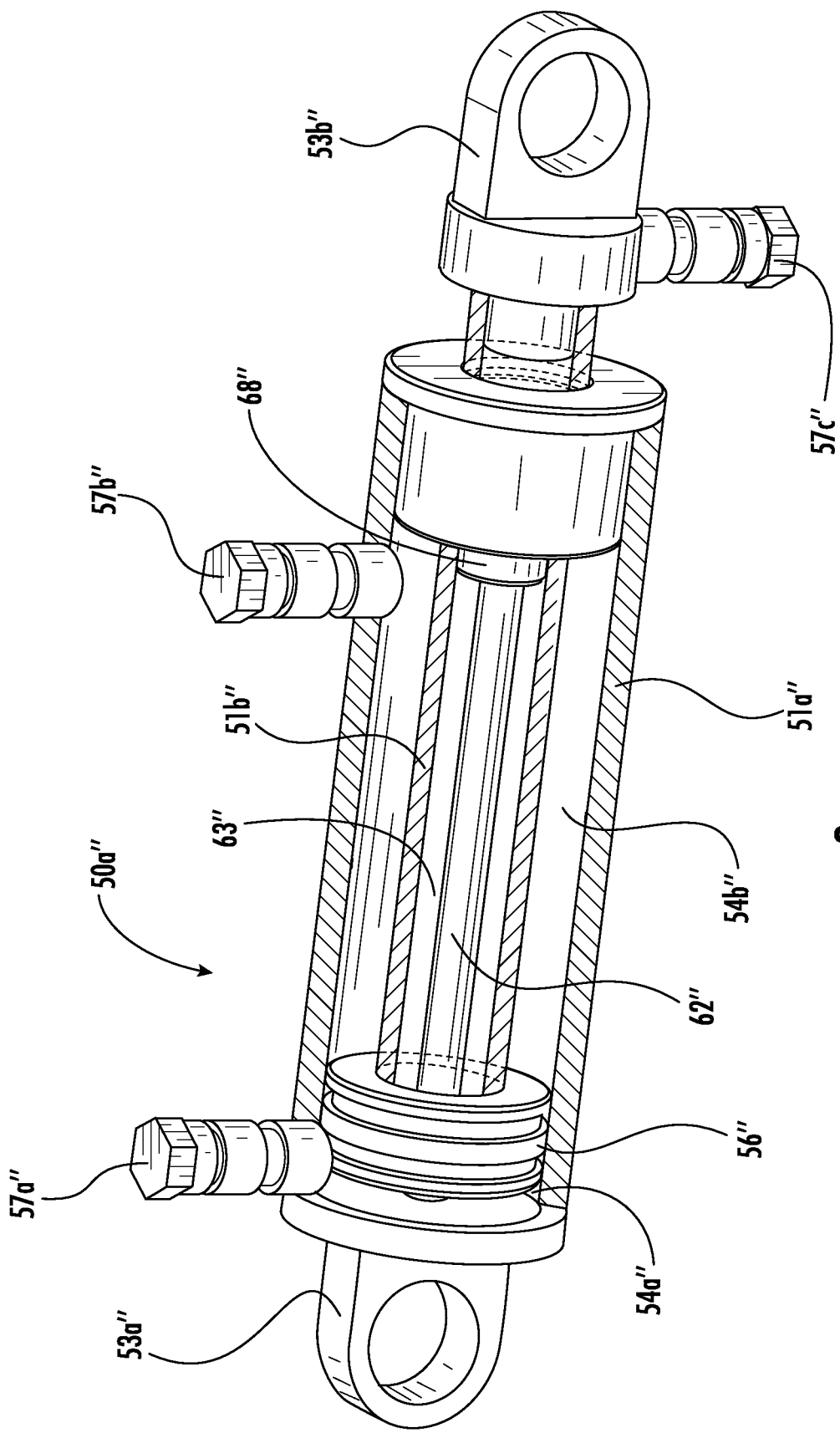
FIG. 8 is another partial cut-away view of the gas spring with associated integral hydraulic damper of FIG. 6.
Figure 9:
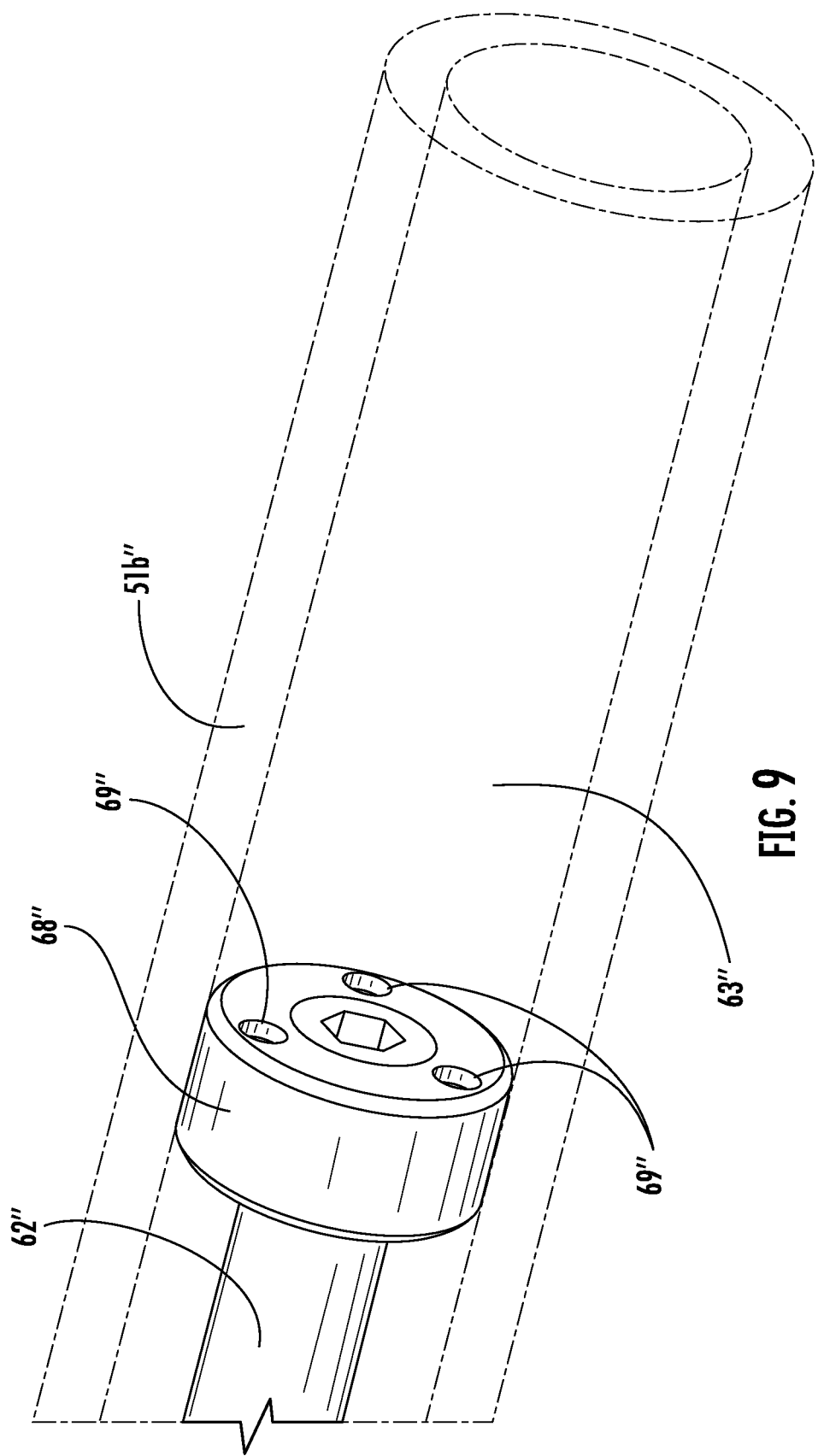
FIG. 9 is an enlarged partial cut-away view of a portion of the gas spring with associated integral hydraulic damper of FIG. 6.

Referring now to FIG. 5, in another embodiment, the wheel assembly 30' may include outboard and inboard inner rings 40b' coupled to outboard and inboard sides of the inner rim 31', respectively to define a closeable gap 41' with adjacent interior portions of the outer rim 33', and more particularly, the radially inwardly extending sidewalls 37'. The inboard and outboard gas springs 50a', 50b' have an operating stroke permitting the inner rings 40a', 40b' to define a mechanical stop. The inner rings 40a', 40b' each include weight-reduction openings 43' therein. Those skilled in the art will appreciate that having a reduced weight may increase the fuel efficiency of the vehicle and/or may increase the lifespan of the wheel assembly 30'. The hinge pins 38', the fastener receiving passageways 24' within an inwardly extending flange ring 25', the tread members 70a'-70i', the outer rim segments 39a'-39i', and the lateral stops 44' are similar to those described above.

Referring now to FIGS. 6-9, in yet another embodiment, the gas springs are in the form of gas springs with associated integral hydraulic dampers 50a". The gas springs with associated integral hydraulic dampers 50a", similar to embodiments of the gas springs described above, have an operating stroke the permits the outer rim to define a mechanical stop. As will be appreciated by those skilled in the art, the gas springs with associated integral hydraulic dampers function similarly to the gas springs and hydraulic dampers described to provide the suspension and provide damping.

Each gas spring with associated integral hydraulic damper 50a" includes a first cylinder body 51a" and a second cylinder body 51b". The second cylinder body 51b" is slidable within the first cylinder body 51a". In other words, the second cylinder body 51b" may conceptually be considered a piston movable within with the first cylinder body 51a".

A first seal 56" is carried by an end of the of second cylinder body 51b". The first seal 56" defines first and second gas chambers 54a", 54h" within the first cylinder body 51a". A shaft 62" is coupled to an end of the first cylinder body 51a" and extends within the first cylinder body and into the second cylinder body 51b". The shaft 62" defines a hydraulic fluid chamber 63" within the second cylinder body 51b". Each gas spring with associated integral hydraulic damper 50a" also includes an enlarged orifice body 68" coupled to the shaft 62" to define a hydraulic damper with the second cylinder body 51b". The enlarged orifice body 68" has orifices 69" therein to permit the flow of hydraulic fluid therethrough. While three orifices 69" are illustrated, there may be any number of orifices.

A flow restrictor 66" is carried within the second cylinder body 51b". The flow restrictor 66" illustratively includes an orifice 67" therein to permit hydraulic fluid to pass therethrough.

Gas ports 57a", 57h" are respectively coupled to the first and second gas chambers 54a", 54h" of each gas spring with associated integral hydraulic damper 50a". A hydraulic fluid port 57c" is coupled to the second cylinder body 51b". While two gas ports and one hydraulic fluid port is illustrated, those skilled in the art will appreciate that there may be more any number of gas and hydraulic fluid ports 57a"-57c".

Each gas spring with associated integral hydraulic damper 50a" also includes first and second mounting brackets 53a", 53b" coupled to the first and second cylinder bodies 51a", 51b", respectively. The first and second mounting brackets 53a", 53b", similar to the mounting brackets described above, are for mounting the gas springs with associated integral hydraulic dampers 50a" between the inner and outer rims.

Those skilled in the art will appreciate that the gas springs with associated integral hydraulic dampers 50a" may advantageously provide a gas suspension and a damper function while saving space within the wheel assembly (i.e., between the inner and outer rims). More particularly, the gas springs with associated integral hydraulic dampers 50a" provide this functionality by way of a Kelvin coupling mechanism, as will be appreciated by those skilled in the art.

Figure 10:
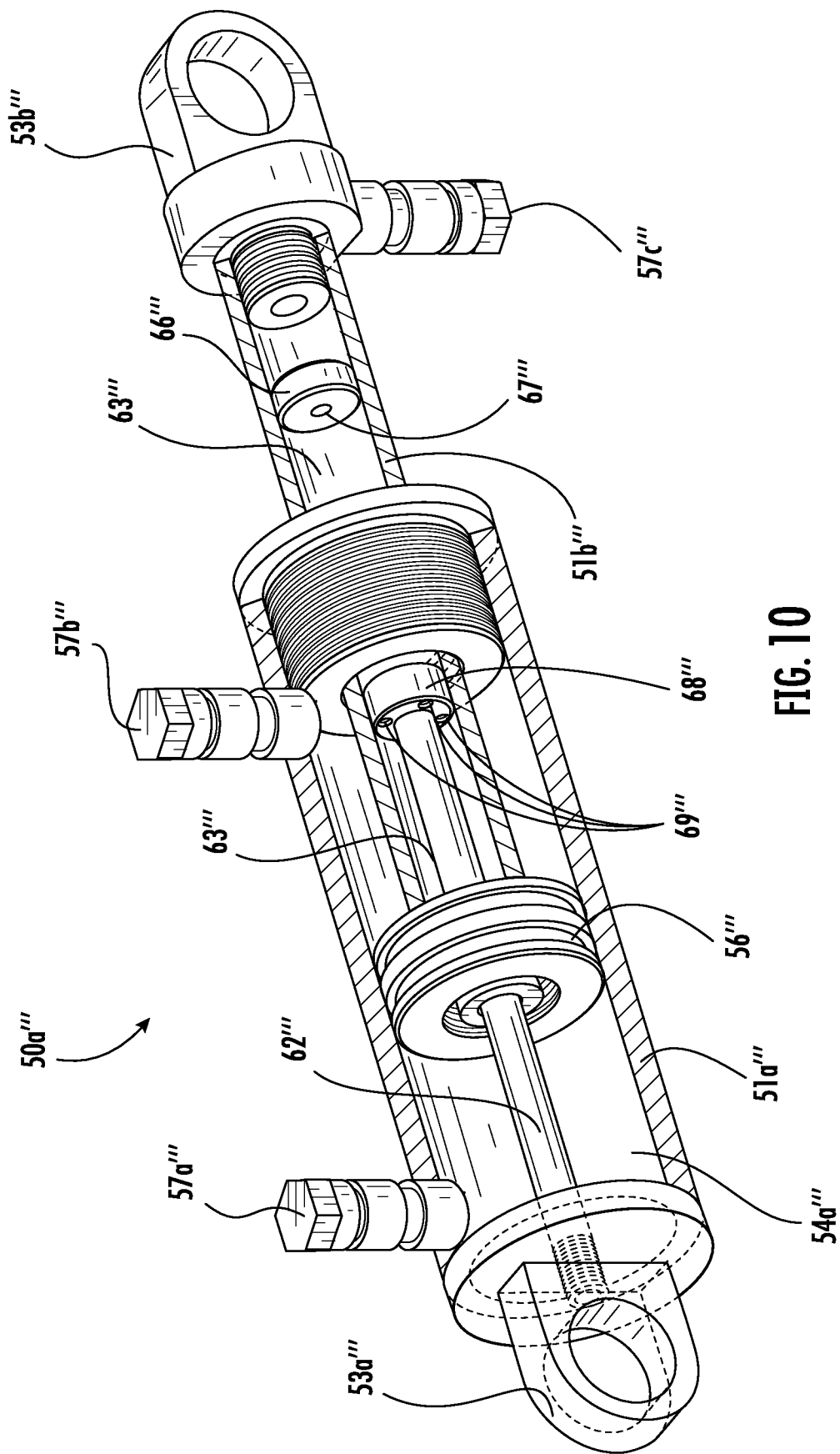
FIG. 10 is a partial cut-away view of a gas spring with associated integral hydraulic damper in accordance with another embodiment.

Referring briefly to FIG. 10, in another embodiment, the shaft 62''', the first seal 56''', an end of the first cylinder body 51a''', and the end of the second cylinder body 51b''' opposite the first seal may be threaded. By provided threads on the shaft 62''', the first seal 56''', and the ends of the first and second cylinder bodies 51a''', 51b''', the gas springs with associated integral hydraulic dampers 50a''' may be adjusted for a desired response with respect to the spring and damper. A volume compensator (e.g., in the form of a reservoir and diaphragm, not illustrated) may be spring loaded, in which case, a charge post may not be desirable. Other elements illustrated but specifically described, for example, the first cylinder body 51a''', the enlarged orifice body 68''' and associated orifices 69''', the first and second gas chambers 54a''', 54b''', the second cylinder wall 66''' and associated orifice 67''', the hydraulic fluid chamber 63''', the ports 57a'''-57c''' and the first and second mounting brackets 53a''', 53b''', are similar to those described above. Further details of a wheel assembly including the gas springs with associated integral hydraulic dampers 50a''' are described in U.S. patent application Ser. No. 17/693,373, the entire contents of which are hereby incorporated by reference.

A method aspect is directed to a method of making a wheel assembly 30. The method may include hingeably coupling a plurality of outer rim segments 39a-39p in end-to-end relation to an adjacent outer rim segment to define an outer rim 33. The method may include operatively coupling a plurality of gas springs 50a, 50b between the inner and outer rims. The method may also include mounting each of a plurality of tread members to a respective one of outer rim segments 39a-39p.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wheel assembly comprising:
an inner rim;
an outer rim surrounding the inner rim and comprising a plurality of outer rim segments each hingeably coupled in end-to-end relation to an adjacent outer rim segment to define the outer rim;
a plurality of gas springs operatively coupled between the inner and outer rims, the plurality of gas springs comprising a plurality of inboard gas springs and a plurality of outboard gas springs arranged in pairs so that an inboard gas spring of a given pair is coupled to a respective outer rim segment adjacent a first circumferential end thereof and an outboard gas spring of the given pair is coupled adjacent a second circumferential end of the respective outer rim segment opposite the first circumferential end and crosses the inboard gas spring in a radial direction; and a plurality of tread members each carried by a respective one of the outer rim segments.

2. The wheel assembly of claim 1 further comprising a plurality of lateral stops each coupled between the inner and outer rims.

3. The wheel assembly of claim 2 wherein the plurality of lateral stops comprises a plurality of hinge retainers.

4. The wheel assembly of claim 1 wherein the plurality of gas springs are coupled between the inner rim and every other one of the plurality of outer rim segments.

5. The wheel assembly of claim 1 further comprising at least one inner ring extending radially outward from the inner rim.

6. The wheel assembly of claim 5 wherein the at least one inner ring comprises an inboard inner ring and an outboard inner ring.

7. The wheel assembly of claim 5 wherein each of the plurality of gas springs has an operating stroke permitting the at least one inner ring to define a mechanical stop.

8. The wheel assembly of claim 1 wherein the plurality of gas springs comprises a plurality of gas springs with integrated hydraulic dampers.

9. The wheel assembly of claim 8 wherein each of the plurality of gas springs with integrated hydraulic dampers comprises:
- a first cylinder body and a second cylinder body slidable therein;
- a first seal carried by an end of the second cylinder body defining first and second gas chambers within the first cylinder body;
- a shaft extending within the first cylinder body and into the second cylinder body defining a hydraulic fluid chamber within the second cylinder body; and
- an enlarged orifice body coupled to the shaft defining a hydraulic damper with the second cylinder body.

10. The wheel assembly of claim 1 wherein each of the plurality of outer rim segments has an arcuate shape.

11. A wheel assembly comprising:
- an inner rim;
- an outer rim surrounding the inner rim and comprising a plurality of outer rim segments each hingeably coupled in end-to-end relation to an adjacent outer rim segment to define the outer rim;
- a plurality of inboard gas springs and outboard gas springs operatively coupled between the inner and outer rims, the plurality of inboard gas springs and outboard gas springs arranged in pairs so that an inboard gas spring of a given pair is coupled to a respective outer rim segment adjacent a first circumferential end thereof and an outboard gas spring of the given pair is coupled adjacent a second circumferential end of the respective outer rim segment opposite the first circumferential end and crosses the inboard gas spring in a radial direction;
- a plurality of hinge retainers serving as lateral stops coupled between the inner and outer rims; and
- a plurality of tread members each carried by a respective one of the outer rim segments.

12. The wheel assembly of claim 11 wherein the plurality of inboard and outboard gas springs is coupled between the inner rim and every other one of the plurality of outer rim segments.

13. The wheel assembly of claim 11 further comprising at least one inner ring extending radially outward from the inner rim.

14. The wheel assembly of claim 11 wherein the plurality of inboard and outboard gas springs comprises a plurality of inboard and outboard gas springs with integrated hydraulic dampers.

15. A method of making a wheel assembly comprising:
- hingeably coupling a plurality of outer rim segments in end-to-end relation to an adjacent outer rim segment to define an outer rim;
- operatively coupling a plurality of gas springs between an inner rim and the outer rim, the plurality of gas springs comprising a plurality of inboard gas springs and a plurality of outboard gas springs arranged in pairs so that an inboard gas spring of a given pair is coupled to a respective outer rim segment adjacent a first circumferential end thereof and an outboard gas spring of the given pair is coupled adjacent a second circumferential end of the respective outer rim segment opposite the first circumferential end and crosses the inboard gas spring in a radial direction; and
- mounting each of a plurality of tread members on a respective one of the outer rim segments.

16. The method of claim 15 further comprising coupling a plurality of lateral stops between the inner and outer rims.

17. The method of claim 16 wherein coupling the plurality of lateral stops comprises coupling a plurality of hinge retainers.

18. The method of claim 15 wherein operatively coupling the plurality of gas springs comprises operatively coupling the plurality of gas springs between the inner rim and every other one of the plurality of outer rim segments.

19. The method of claim 15 further comprising coupling at least one inner ring to extend radially outward from the inner rim.

* * * * *